US010997982B2

(12) United States Patent
Lester et al.

(10) Patent No.: US 10,997,982 B2
(45) Date of Patent: May 4, 2021

(54) SYSTEMS AND METHODS FOR INTELLIGENT VOICE ACTIVATION FOR AUTO-MIXING

(71) Applicant: Shure Acquisition Holdings, Inc., Niles, IL (US)

(72) Inventors: Michael Ryan Lester, Colorado Springs, CO (US); Jose Roberto Regalbuto, Chicago, IL (US); David Grant Cason, Palatine, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 36 days.

(21) Appl. No.: 16/426,981

(22) Filed: May 30, 2019

(65) Prior Publication Data
US 2019/0371354 A1  Dec. 5, 2019

Related U.S. Application Data

(60) Provisional application No. 62/678,863, filed on May 31, 2018.

(51) Int. Cl.
*G10L 21/0308* (2013.01)
*G10L 21/0224* (2013.01)
(Continued)

(52) U.S. Cl.
CPC ...... *G10L 21/0308* (2013.01); *G10L 21/0224* (2013.01); *G10L 21/0232* (2013.01); *G10L 25/84* (2013.01); *G10L 2021/02163* (2013.01)

(58) Field of Classification Search
None
See application file for complete search history.

(56) References Cited

U.S. PATENT DOCUMENTS 4,373,191 A   2/1983 Fette
5,555,447 A   9/1996 Kotzin
(Continued)

FOREIGN PATENT DOCUMENTS

CA   2359771   4/2003
CA   2475283   1/2005
(Continued)

OTHER PUBLICATIONS

Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
(Continued)

*Primary Examiner* — Stella L. Woo
(74) *Attorney, Agent, or Firm* — Neal, Gerber & Eisenberg LLP

(57) ABSTRACT

Embodiments allow for an auto-mixer to gate microphones on and off based on speech detection, without losing or discarding the speech received during the speech recognition period. An example method includes receiving and storing an input audio signal. The method also includes determining, based on a first segment of the input audio signal, that the input audio signal comprises speech, and determining a delay between the input audio signal and a corresponding output audio signal provided to a speaker. The method also includes reducing the delay, wherein reducing the delay comprises removing one or more segments of the stored input audio signal to create a time-compressed audio signal and providing the time-compressed audio signal as the corresponding output audio signal. The method also includes determining that the delay is less than a threshold duration, and responsively providing the input audio signal as the corresponding output audio signal.

47 Claims, 5 Drawing Sheets

(51) Int. Cl.
  *G10L 21/0232* (2013.01)
  *G10L 25/84* (2013.01)
  *G10L 21/0216* (2013.01)

(56) References Cited

U.S. PATENT DOCUMENTS

| | | | |
|---|---|---|---|
| 5,991,277 | A | 11/1999 | Maeng |
| 6,885,986 | B1 | 4/2005 | Gigi |
| 6,889,183 | B1 | 5/2005 | Gunduzhan |
| 7,013,267 | B1 | 3/2006 | Huart |
| 7,130,309 | B2 | 10/2006 | Planka |
| 7,412,376 | B2* | 8/2008 | Florencio ............... G10L 25/87 370/470 |
| 7,558,381 | B1 | 7/2009 | Ali |
| 7,830,862 | B2 | 11/2010 | James |
| 8,121,834 | B2 | 2/2012 | Rosec |
| 8,244,536 | B2 | 8/2012 | Arun |
| 8,280,728 | B2 | 10/2012 | Chen |
| 9,521,057 | B2 | 12/2016 | Klingbeil |
| 9,734,835 | B2 | 8/2017 | Fujieda |
| 9,754,572 | B2 | 9/2017 | Salazar |
| 2006/0161430 | A1 | 7/2006 | Schweng |
| 2008/0033723 | A1 | 2/2008 | Jang |
| 2008/0046235 | A1 | 2/2008 | Chen |
| 2009/0254340 | A1* | 10/2009 | Sun .................. G10L 21/0208 704/226 |
| 2010/0142721 | A1* | 6/2010 | Wada .................. H04R 27/00 381/77 |
| 2010/0208605 | A1 | 8/2010 | Wang |
| 2014/0122060 | A1* | 5/2014 | Kaszczuk ............. G10L 13/04 704/9 |
| 2016/0055859 | A1* | 2/2016 | Finlow-Bates ... H04M 3/42221 704/225 |
| 2016/0105473 | A1 | 4/2016 | Klingbeil |
| 2016/0196836 | A1 | 7/2016 | Yu |
| 2016/0357508 | A1* | 12/2016 | Moore ................... G06F 3/162 |
| 2018/0102136 | A1* | 4/2018 | Ebenezer .............. G10L 25/78 |
| 2019/0295540 | A1* | 9/2019 | Grima .................. G10L 15/22 |

FOREIGN PATENT DOCUMENTS

| | | |
|---|---|---|
| CN | 101833954 | 9/2010 |
| CN | 101894558 | 11/2010 |
| CN | 104347076 | 2/2015 |
| EP | 1952393 | 8/2008 |
| EP | 2133867 | 12/2009 |
| EP | 2159789 | 3/2010 |
| EP | 2772910 | 9/2014 |
| KR | 100298300 | 5/2001 |
| WO | 2004027754 | 4/2004 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2013016986 | 2/2013 |
| WO | 2013182118 | 12/2013 |

OTHER PUBLICATIONS

Cabral, et al., Glottal Spectral Separation for Speech Synthesis, IEEE Journal of Selected Topics in Signal Processing, 2013, 15 pp.
International Search Report and Written Opinion for PCT/US2019/034692 dated Sep. 10, 2019, 11 pp.
Moulines, et al., "Pitch-Synchronous Waveform Processing Techniques for Text-to-Speech Synthesis Using Diphones," Speech Communication 9, 1990, 15 pp.
Parikh, et al., "Methods for Mitigating IP Network Packet Loss in Real Time Audio Streaming Applications," GatesAir, 2014, 6 pp.
Tan, et al., "Pitch Detection Algorithm: Autocorrelation Method and AMDF," Department of Computer Engineering, Prince of Songkhla University, Jan. 2003, 6 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.

* cited by examiner

100

SYSTEMS AND METHODS FOR INTELLIGENT VOICE ACTIVATION FOR AUTO-MIXING

CROSS-REFERENCE

This application claims priority to U.S. Provisional Application No. 62/678,863, filed on May 31, 2018, the content of which is incorporated herein in its entirety.

TECHNICAL FIELD

This application generally relates to voice activation for microphone auto-mixing. In particular, this application relates to the use of novel systems and methods for compressing audio prior to activation in an auto-mix in order to eliminate lost speech during speech detection, decision making to include in the mix, and possible channel acquisition.

BACKGROUND

Conferencing and presentation environments, such as auditoriums, boardrooms, video conferencing settings, and the like, can involve the use of microphones for capturing sound from audio sources. The audio sources may include human speakers, for example. The captured sound may be disseminated to an audience through speakers in the environment, a telecast, and/or a web cast.

In some of these environments, there may be more than one microphone turned on at any given time, allowing for each speaker to have his or her own microphone. An auto-mixing system may be used to enable one microphone at a time to be "on," in order provide high quality audio output while reducing interference, feedback, and other audio issues that may be present when more than one microphone is receiving audio and a speaker attempts to output the received audio.

In these setups, the auto-mixing system may receive audio from a microphone, analyze it to determine whether the audio is speech, errant noise, or something else, and only after determining that the audio is speech will the microphone be made "active" and received audio played back through the speaker. This leads to a loss of the speech received during the time when the auto-mixing system is determining whether the received audio includes speech. In some cases, this can mean that the first syllable or even entire words of the speech segment can be lost, thereby reducing the user experience.

Accordingly, there is an opportunity for methods and systems that address these concerns. More particularly, there is an opportunity for methods and systems that can enable the playback of the normally discarded speech used to determine whether received audio includes speech.

SUMMARY

The invention is intended to solve the above-noted problems by providing systems and methods that are designed to, among other things, combine time compression of received audio with variable speed playback in order to reduce lost speech during speech detection and channel acquisition, particularly in an auto-mixing environment.

In a first example, a method includes receiving an input audio signal, storing the input audio signal, and determining, based on a first segment of the input audio signal, that the input audio signal comprises speech. The method also includes determining a delay between the input audio signal and a corresponding output audio signal provided to a speaker. The method further includes reducing the delay, wherein reducing the delay comprises removing one or more segments of the stored input audio signal to create a time-compressed audio signal, and providing the time-compressed audio signal as the corresponding output audio signal. The method still further includes determining that the delay is less than a threshold duration. And the method yet further includes responsively providing the input audio signal as the corresponding output audio signal.

In a second example, a system for auto-mixing audio signals includes a microphone configured to receive an input audio signal, a speaker configured to playback an output audio signal corresponding to the input audio signal, and a processor. The processor is configured to receive the input audio signal, store the input audio signal, determine, based on a first segment of the input audio signal, that the input audio signal comprises speech, and determine a delay between the input audio signal and the corresponding output audio signal. The processor is also configured to reduce the delay, wherein reducing the delay comprises removing one or more segments of the stored input audio signal to create a time-compressed audio signal and providing the time-compressed audio signal as the corresponding output audio signal. The processor is further configured to determine that the delay is less than a threshold duration. And the processor is yet further configured to responsively provide the input audio signal as the corresponding output audio signal.

In a third example, a non-transitory, computer-readable memory has instructions stored thereon that, when executed by a processor, cause the performance of a set of acts including receiving an input audio signal, storing the input audio signal, determining, based on a first segment of the input audio signal, that the input audio signal comprises speech, and determining a delay between the input audio signal and a corresponding output audio signal provided to a speaker. The set of acts further includes reducing the delay, wherein reducing the delay comprises removing one or more segments of the stored input audio signal to create a time-compressed audio signal, and providing the time-compressed audio signal as the corresponding output audio signal. The set of acts further includes determining that the delay is less than a threshold duration. And the set of acts still further includes responsively providing the input audio signal as the corresponding output audio signal.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
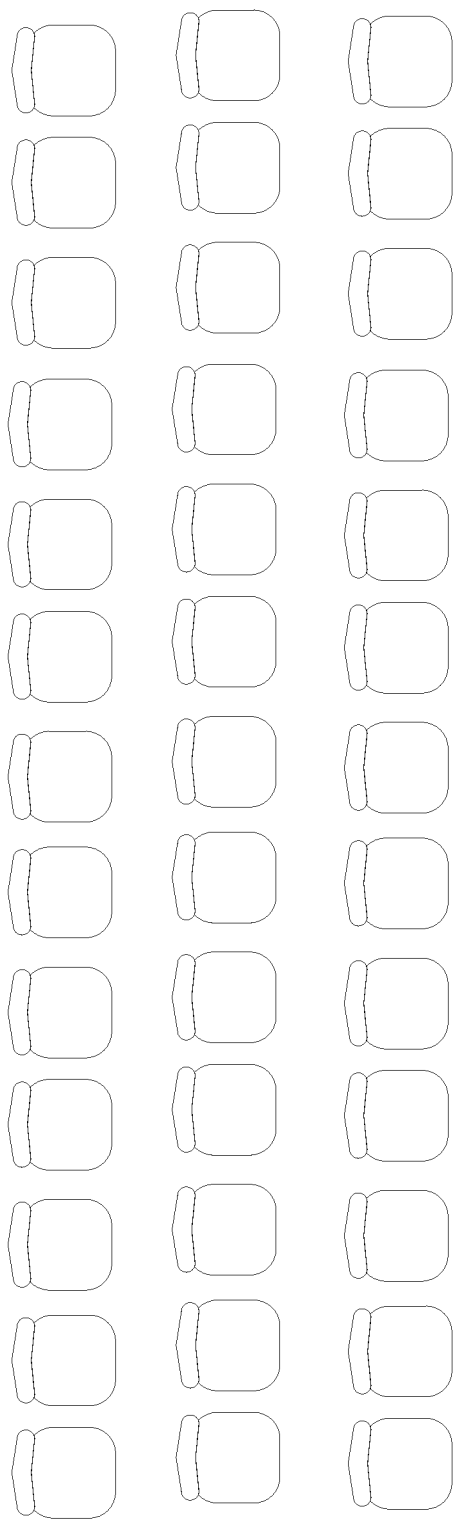
FIG. 1 is a schematic representation of an exemplary environment including a plurality of microphones, according to embodiments of the present disclosure.
Figure 1:
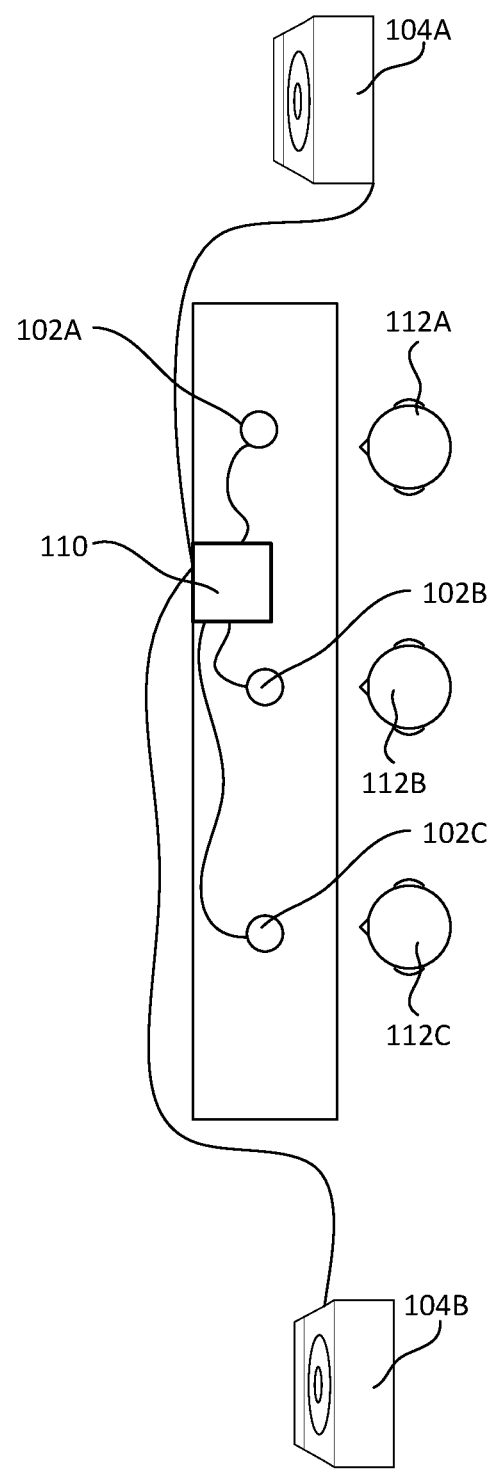

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

As noted above, many environments may make use of multiple microphones that are intended to have their received audio output through speakers one at a time. For instance, panel discussions, conferences, boardrooms, meetings, etc. may all include multiple speakers and multiple microphones, sometimes with a one-to-one relationship wherein each speaker has a corresponding microphone.

In order to reduce feedback, interference, crosstalk, and other negative effects caused by multiple microphones operating at the same time within close proximity, an auto-mixing system may be used. The auto-mixing system may enable only one microphone to be active at a given time. In order to determine which microphone should be active, the auto-mixing system may be configured to analyze audio signals received by each microphone to determine whether the microphone includes speech, noise, silence, or some other category of audio. This analysis, however, requires a non-zero amount of time to be completed. And as a result, both the audio being analyzed for speech and the audio received while the analysis is being completed may be lost. While this could be as low as tens of milliseconds, in some cases the analysis can take a second or more, meaning that the first second or more of speech is lost. This can be rather jarring for a speaker and audience to experience, and can lead to a poor user experience.

In general, the auto-mixing system includes a trade-off between the time required to determine whether there is speech being received, and the confidence that the system has that the received audio includes speech. As such, when the auto-mixer reduces the time used to determine whether a given microphone is receiving speech, the auto-mixer also reduces the confidence of whether the microphone is actually receiving speech which increases the chance that noises will be included in the auto-mix. Thus, while less speech is lost or discarded by using faster speech detection, it is more likely that a microphone will be erroneously made active even if it is only receiving noise, silence, or other non-speech containing audio.

With these issues in mind, example embodiments of the present disclosure may enable an auto-mixing system to receive audio from a microphone, determine based on the received audio that there is speech included, and playback time-compressed input audio without losing any significant information. This may be done by receiving audio into a microphone and storing it in a data storage or memory. The stored audio signal may then be analyzed while additional input audio continues to be received and stored. A first portion of the stored audio may be analyzed to determine whether it includes speech. If the first portion includes speech, then the auto-mixer may determine that the microphone from which it was received should be made "active," meaning the audio received by the microphone should be output via speakers, transmitted to another device, or otherwise have some action performed on it.

Then, rather than immediately enabling input audio received by the microphone to be output by the system (e.g., real-time playback), the input audio may be continuously stored, time-compressed, and a reduced audio signal may be output by the system. By playing back the reduced audio signal while continuing to receive and compress additional input audio, the playback may gradually catch up to real-time.

If the duration of the analysis determining whether the audio includes speech was one second, then there will be one second of received audio that may ordinarily have been lost or discarded. In embodiments disclosed herein, however, that received audio is instead time-compressed, and output with a delay (wherein the delay corresponds to the difference in time between when the input audio is received and a corresponding output is provided). Then, as more input is received, compressed, and output, the one second delay is gradually reduced over time. The additional input audio is compressed and output until the delay between the input audio and the system output is reduced to less than a threshold amount (e.g., one pitch period). When the delay is reduced to below the threshold, the system may perform a smaller time compression such that the delay is reduced to zero (e.g., if the system would perform a compression of 10 ms, it might choose a smaller compression amount that matches the remaining amount of delay still present), after which the system output is simply the uncompressed input audio received by the microphone.

As a result of the embodiments disclosed herein, the auto-mixing system is configured to output all relevant information received in the microphone (i.e., no words or relevant speech is lost), and the system can have a higher confidence in speech detection without losing large amounts of speech information or allowing erroneous activation or "gating on" of microphones. Embodiments disclosed herein accomplish these goals by outputting received audio from the past at an average rate of up to two times faster (or a compression of two times in a temporal dimension) by outputting received audio from a buffer of past samples and utilizing a crossfade with samples that exist in future time with respect to the current output, until the system catches up to real-time playback. Once the output audio signal and the input received audio signal resolve time bases (e.g., the output catches up to the input), the system simply outputs the newly received audio and resets the compression system until the channel is released and another iteration of speech detection is required.

FIG. 1 illustrates an example environment 100 in which the methods and systems disclosed herein may be used. FIG. 1 shows a plurality of microphones 102A-C, a computing device 110, and speakers 104A-B. While FIG. 1 illustrates one possible environment, it should be understood that the concepts and features disclosed herein may be applied to any suitable environment, including but not limited to boardrooms, conference rooms, offices, theaters, and more.

Microphones 102A-C may be any microphone type configured to receive an input audio signal. In some examples, there may be one microphone per person speaking, one or more people may share a microphone, or there may be multiple microphones per person. The types of microphones that can be used may include boundary microphones and button microphones that can be positioned on or in a surface (e.g., a table), shotgun microphones that are primarily sensitive to sounds in one direction, and many other types of microphone. Each microphone or set of microphones can have a particular pick-up pattern tailored for use in a given environment. Typical polar patterns for microphones can include omnidirectional, cardioid, sub-cardioid, super-cardioid, hyper-cardioid, bidirectional, and array-beamformed patterns. The polar pattern chosen for a particular microphone or cartridge may be dependent on where the audio source is located, the desire to exclude unwanted noises, and/or other considerations.

Microphones 102A-C may be electronically and/or communicatively coupled to the computing device 110. This may be via a wire, or may be done wirelessly.

The input audio signal may be supplied by one of the people 112A-C corresponding to the microphones. As such, an input audio signal may include voiced speech, non-voiced speech, silence, noise, and more. Additional details regarding the elements of a given input audio signal are discussed in further detail below.

Speakers 104A-B may be any suitable speaker configured to output an audio signal. Speakers 104A-B may be electronically and/or communicatively coupled to the computing device 110. This may be done either through a wire, or wirelessly.

Various embodiments disclosed herein describe receiving input audio via one or more microphones and outputting via the speakers 104A-B. However, in some embodiments the output may instead or additionally include transmittal to a remote speaker at another location (e.g., in a teleconferencing environment, webcast, etc.). As such, where various disclosed embodiments recite output via a speaker, or outputting a signal using a speaker, it should be understood that these may also or alternatively refer to outputting the signal to another device or system having a separate remote speaker (e.g., the far end of a teleconference system).

Figure 2:
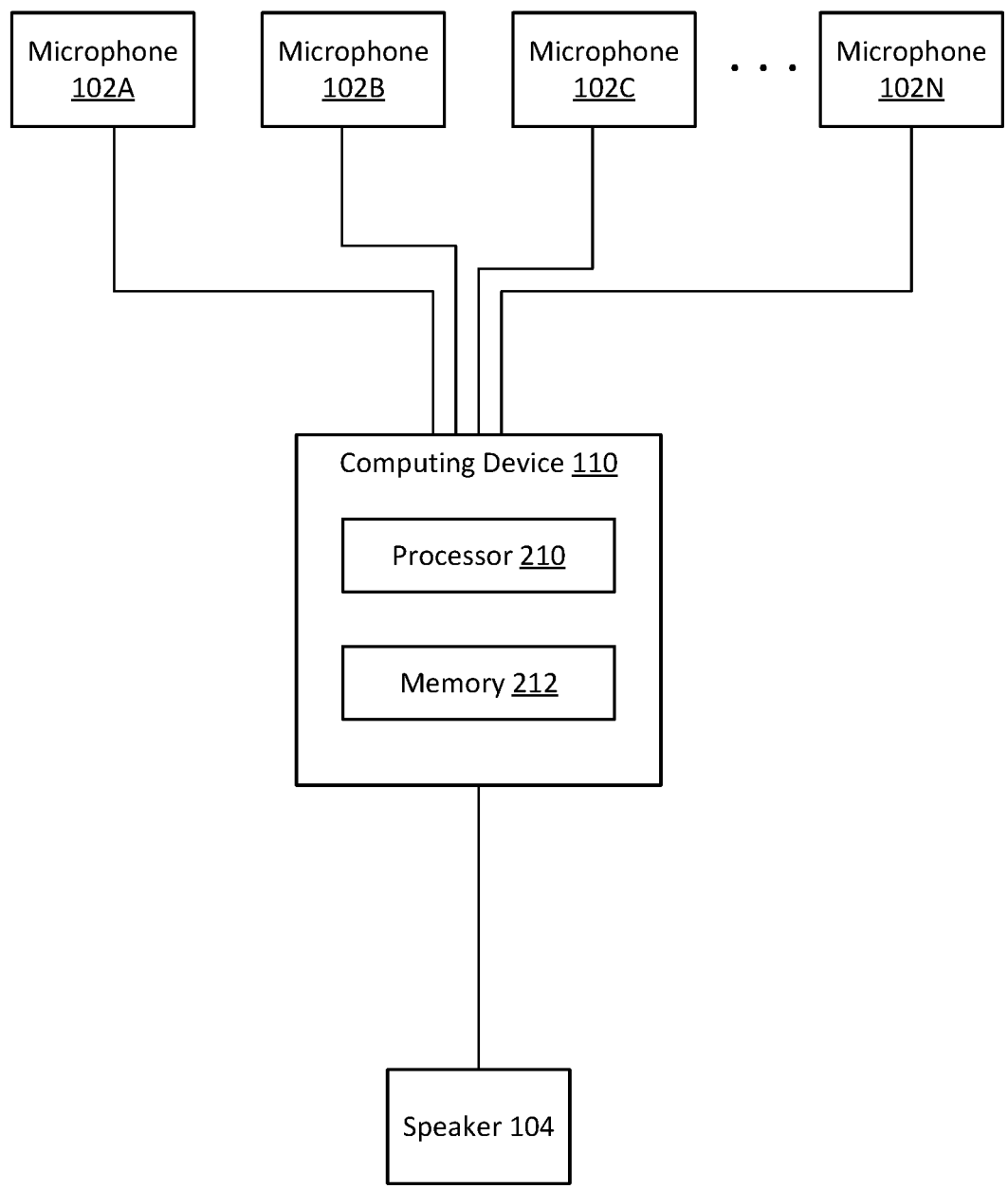
FIG. 2 is a simplified block diagram of an example system according to embodiments of the present disclosure.

FIG. 2 illustrates a simplified block diagram of a system similar or identical in some respects to the system of FIG. 1, including microphones 102A-N, computing device 110, and a speaker 104.

Computing Device 110 may be any suitable computing device including a processor 210 and memory 212, configured to carry out the various functions and acts described herein. In some examples, computing device 110 may be an auto-mixer, laptop or desktop computer, or any other device that is configured to receive and analyze audio signals from a microphone.

Computing device 110 may be configured for performing a variety of functions or acts, such as those described in this disclosure (and accompanying drawings). The computing device 110 may include various components, including for example, a processor 210, memory 212. Computing device 110 may also include a display, user interface, and/or one or more other electronic components. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device 110 may be physically remote and may be communicatively coupled to the computing device, via a communication interface for example.

Processor 210 may include a general purpose processor (e.g., a microprocessor) and/or a special purpose processor (e.g., a digital signal processor (DSP)). Processor 210 may be any suitable processing device or set of processing devices such as, but not limited to, a microprocessor, a microcontroller-based platform, an integrated circuit, one or more field programmable gate arrays (FPGAs), graphics processor units (GPUs), and/or one or more application-specific integrated circuits (ASICs).

The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Processor 210 may be configured to receive input audio signal from a given microphone 102A. Processor 210 may then store the received input audio signal in memory 212. In some examples, the input audio signal may be stored in a circular buffer. Processor 210 may be configured to continuously store incoming audio as it is received.

While continuing to store incoming input audio signal, processor 110 may analyze a first segment of the input audio signal stored in the memory to determine, based on the first segment of the input audio signal, that the input audio signal comprises speech. In some examples, the first segment may be a one-second segment of the input audio signal. In other examples, shorter or longer durations of input audio signal may be used. Further, the first segment may be uncompressed input audio.

In analyzing the first segment, the processor 210 may filter the input audio signal and/or the first segment of input audio signal using one or more filters. The processor 210 may also apply one or more algorithms to the audio signal/first segment, in order to detect various speech patterns and/or signal elements that indicate that the input audio signal comprises speech. If it is determined that the first segment includes speech, computing device 110 may responsively determine that microphone 102A (i.e., the microphone that provided the input audio signal) should be made active or gated on. This whole process of analysis and determining that the microphone should be gated on may take approximately one second. But it should be noted that other durations may be used as well, particularly where the system is being designed to operate based on the tradeoff between confidence or certainty of detection of speech and speed of detection.

In some examples, computing device 110 may also determine one or more confidence metrics with respect to the determination of whether the audio signal includes compressible periodic content. Confidence metrics may be determined with respect to the determination of the fundamental period and other elements described herein.

Computing device 110 may also be configured to measure a delay between the input audio signal and an output audio signal based on control of an external buffer signal corresponding to the input audio signal. The delay is a measure of the time difference between when a given element of the input audio signal is received (e.g., a word, syllable, or other discrete part of the audio signal etc.), and when a corresponding element is output. In some examples, the corresponding output element may be identical to the input element, particularly where the element includes a significant amount of audio information.

The delay may initially be the time required to determine whether the input audio signal comprises speech. During this analysis time, the input audio continues to be stored in the memory. However because no decision as to whether the input audio includes speech has been made yet, the input audio is not yet output. As such, if the analysis takes one second, the initial delay amount at the time when the computing device determines that the input audio signal comprises speech is one second.

Then, as the input audio signal is time-compressed (via removal of one or more segments as discussed in further detail below) and output, the delay between the input audio signal and the corresponding output audio signal is reduced. This is because the time-compressed audio can be played back or output at on average up to two times the input speed, resulting in a reduction of the delay. Thus where the compression is by a factor of two, the delay can thus be reduced to near zero over a duration of time that is approximately the same as the duration of the analysis to determine whether there was speech in the audio signal. However where the compression is less, the reduction in delay may be carried out of a longer duration of time. The reduction in delay is thus dependent on the amount of compression, the suitability of applying compression to the speech content, and the duration over which the delay is reduced to near-zero corresponds inversely to the amount of compression.

The delay therefore changes over time as the time-compressed signal is output. At the point in time at which it is determined that the input audio signal comprised speech, the value of the initial system delay is the duration of the first segment of the input audio signal. This initial value is also the maximum delay for this iteration, because as time progresses and the input audio signal is time-compressed and output, the delay will gradually decrease.

Computing device 110 via processor 210 may be configured to reduce the delay. Reducing the delay can include removing one or more segments of the stored input audio signal to create a time-compressed or "reduced" audio signal, and outputting the reduced audio signal. The reduced audio signal corresponds to the input audio signal from which it was created, and as the reduced audio signal is output, the delay in time from when a given element of the input audio was received and when the corresponding element of the reduced audio signal is output is reduced.

As noted above, the input audio signal may be received and stored in memory. This may be done on a rolling basis, such that as more and more input audio signal is received it is stored in a circular buffer in memory.

In order to time-compress the input audio signal, one or more algorithms, functions, or other operations may be done. In some examples, the input audio signal may be filtered to remove high frequencies and eliminate a DC aspect of signal. The signal may also be down-sampled and blocked into discrete windows (e.g., 25 ms windows).

In some examples, processor 210 may determine a fundamental period corresponding to the input audio signal. The fundamental period may be determined by applying a circular averaged magnitude difference function (CAMDF) or other appropriate period estimation function to the input audio signal. Algorithmic delay can be minimized by applying time domain period detection such as the CAMDF, Average Squared Mean Difference Function (ASMDF), autocorrelation, zero crossing detection, or combinatorial algorithms such as the YIN algorithm or the McLeod Pitch Method (MPM). Frequency domain techniques can also be used at the tradeoff of latency such as the periodogram, harmonic product spectrum, cepstral analysis, spectral reassignment, Grandke interpolation, and maximum likelihood estimation to predefined frequency maps. The CAMDF or other appropriate period estimation function may be bounded by the expected fundamental frequency range of voice.

Applying the CAMDF or other appropriate period estimation function may produce an estimate of the signal autocorrelation, which can then be used to detect the fundamental period.

In some examples, the CAMDF or other appropriate period estimation function may produce an estimated fundamental period. The estimated fundamental period may then be passed to a high resolution averaged magnitude difference function to produce a more refined and more accurate estimate of the fundamental period.

Computing device 110 may determine that the determined fundamental period may correspond to one or more glottal periods corresponding to the input audio signal. A glottal period may be a repeating period of the audio signal that correlates to the movement of the glottis of a person's mouth as he or she speaks. In some examples, the input audio signal may be searched by the processor 210 to determine the most prominent glottal closure feature. Other glottal closure features may then be determined based on the fundamental period and the determined most prominent glottal closure feature. From this information, the glottal period may then be determined.

In some examples, the input audio signal may be stored in a circular buffer in memory 212. Once one or more estimated glottal periods of the input audio signal are determined, a time-domain pitch synchronous overlap add (TD-PSOLA) or other appropriate time domain crossfade process may be used to break up the audio signal into segments. Frequency domain time removal techniques could be used as well such as removal of windowed frequency domain buffers. In some examples, these segments may be estimated glottal periods. One or more segments may be removed from the input audio signal to create a reduced audio signal. Removal of one or more segments may be done in such a way that the signal is reduced in time without altering the pitch of the signal.

Identified audio segments to be removed may correspond to one or more different categories of audio. For instance, some segments may include voiced speech, some may include non-voiced speech, some may include silence, and some may include noise or other audio signal elements. Voiced speech can refer to speech produced when a person's vocal cords vibrate during the pronunciation of a phoneme. For instance, voiced speech may be the first half of the word "erase." Non-voiced speech, on the other hand, may not include the use of vocal chords. Non-voiced speech may be, for instance, the second half of the word "erase." Silence segments may be segments of the audio signal that do not include voiced or non-voiced speech. Categories can also be referred to as periodic content, non-periodic content, and quiet or silent content.

Figure 4:
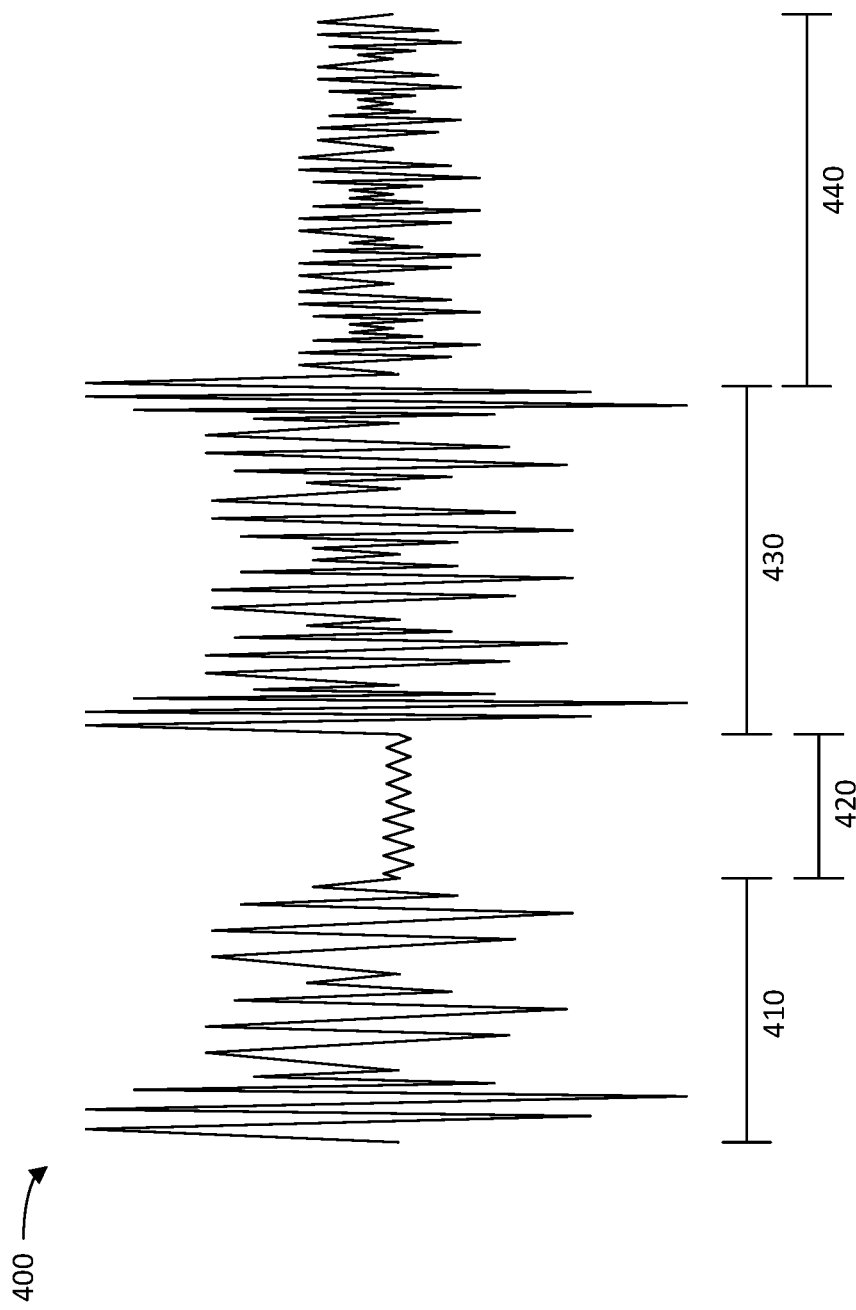
FIG. 4 is an example segment of audio signal according to embodiments of the present disclosure.

FIG. 4 illustrates a sample portion 400 of an audio signal. In FIG. 4, segment 410 may correspond to noise, segment 420 may correspond to silence, segment 430 may correspond to voiced speech, and segment 440 may correspond to non-voiced speech.

When removing one or more segments of the audio signal, removal may depend on the type or category into which the segments fall. For instance, where a given portion of audio includes periodic content, one or more non-adjacent estimated periods may be removed. In a particular example, every other estimated period may be removed.

Where the portion of audio includes non-periodic content, in some examples the length of the audio section that is removed is determined in a manner that maintains good subjective audio quality during compression while maximizing the compression rate.

And where the portion of audio includes silence, the length of the audio section that is removed is also determined in a manner that maintains good subjective audio quality during compression while maximizing the compression.

Removal of non-periodic or silence periods may be done using a time-domain overlap add or other appropriate time domain crossfade (similar to the TD-PSOLA, but not pitch synchronous).

In some examples, a given input audio signal may include a combination of periodic, non-periodic, and silence audio segments. In these examples, computing device 110 may be configured to prioritize removal of silence over non-periodic content, and removal of non-periodic content over periodic content. This may result in removal of the least amount of pertinent audio data while maintaining the correct pitch and reducing the time dimension of the signal.

Prioritizing removal may also include removing a greater number of one category than another. For instance, where a given signal includes multiple identified audio segments to be removed comprised of silence, periodic content, and non-periodic content, removal may include only removing some or all of the silent segments. In other examples, removal may include removing a proportionate amount of silent segments for every non-periodic content, or removing identified audio segments in some other ratio with respect to each other. In this manner, the input audio signal can be reduced without removing important audio content needed for understanding the speech included in the output signal.

Once one or more segments of the input audio signal are removed, the remaining segments may be combined to form a resulting reduced output audio signal. The reduced output audio signal may then be provided to the speakers for output.

Then, over time, as additional input audio is continuously received and time-compressed as describe above, the delay between the input audio and the output audio is gradually reduced.

As indicated above, one or more confidence metrics may be calculated to determine the likelihood of periodic speech content, unvoiced speech or noise content, silence, and other elements described herein. One or more other confidence metrics may be used to inform how often to remove audio segments in order to reduce the likelihood of subjective perception of the time compression. In addition, one or more confidence metrics can tell you whether to perform a synchronous removal, non-synchronous removal, or wait until a more appropriate opportunity for compression arises.

Processor 210 may be configured to monitor the delay as it changes, and determine that the delay is less than a threshold duration. Once the delay is less than the threshold duration, the processor may then provide the input audio directly as output, without performing any time-compression. In order to do this, processor 210 may perform a smaller compression that matches the remaining delay amount to transition from providing the reduced audio signal to providing the input audio signal directly as output, without performing any compression, segment removal, or fundamental or estimated glottal period removal.

In some examples, the threshold may be one fundamental period, or some other jump period corresponding to the input audio signal or related to the jump that occurs during silence or noise. Once the processor determines that the delay is less than this threshold, it may then switch to real-time playback.

In some examples, processor 210 may determine that a current input audio signal comprises silence (i.e., wait for the input to be silent), and then responsively make a jump that is amenable to good subjective audio quality during the silence region. This reduces the chance that the asynchronous jump to real-time playback occurs in the middle of a person speaking, and results in a lower probability that any meaningful information is lost. It also provides the most seamless transition from output of the time compressed reduced audio signal to the uncompressed input audio signal.

Figure 3:
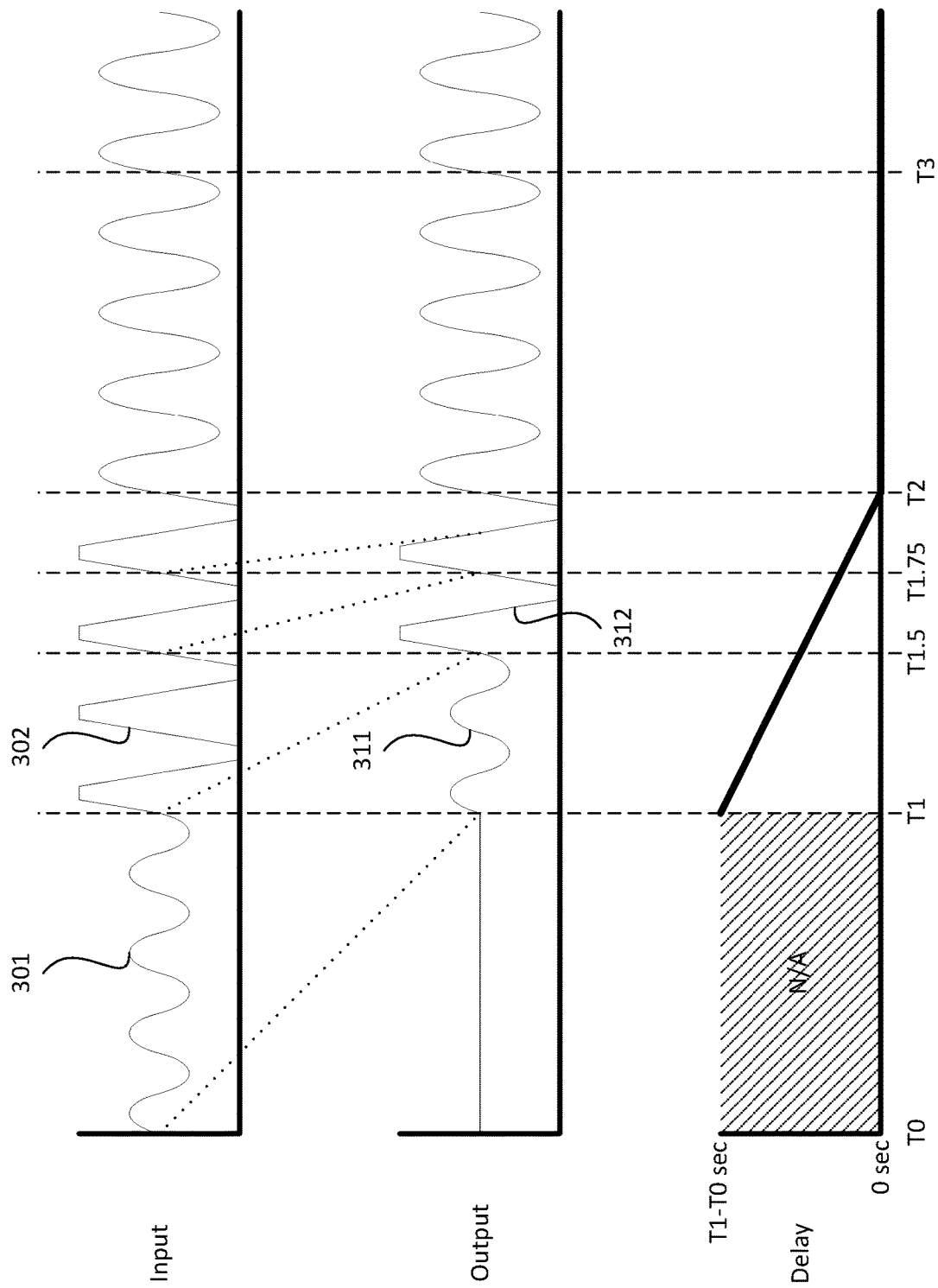
FIG. 3 is a simplified graph showing an input audio signal, and output audio signal, and a delay over time, according to embodiments of the present disclosure.

FIG. 3 illustrates a simplified graph showing an input audio signal vs time, a corresponding output audio signal vs time, and the delay between the input and the output vs time.

From T0 to T1, the computing device may be performing an analysis on the input audio signal to determine whether the input audio signal comprises speech. In some examples, this analysis may occur using the input signal from T0 to T1 in the analysis. In other examples, the analysis may occur using the input audio signal from prior to T0 (i.e., using audio received prior to the start of the analysis). This may occur when the computing device receives and stores audio prior to beginning the process of determining whether the input audio includes speech.

At T1, the computing device has determined that the input audio signal comprises speech, and responsively determines that the microphone should be made active or gated on.

Also at T1, it can be seen that the delay between the input audio signal and the corresponding output is (T1–T0) seconds. (T1–T0) seconds is also the duration that was needed to determine that the input audio signal comprises speech. Thus at T1, it can be said that the output lags behind the input by T1–T0 seconds.

During or after the time period from T0 to T1, input audio signal segment 301 is stored and time-compressed as described above. In the example shown in FIG. 3, segment 301 is compressed to half its original duration, without changing the pitch. The time-compressed signal is then output via speakers beginning at T1 and ending at T1.5. This is shown as segment 311 in FIG. 3.

While reduced audio signal segment 311 is being output, from T1 to T1.5, the second input audio signal segment 302 is received, stored, and time compressed as described above. In the example shown in FIG. 3, segment 302 is compressed to half its original duration, without changing the pitch. The time compressed signal is then output via speakers beginning at time T1.5, and ending at time T1.75. This is shown as segment 312.

This process is completed for successive segments of the input audio signal, while corresponding audio signal segments are being output, until the output catches up to the input. The difference in time between the input and the corresponding output is visualized as the delay in FIG. 3, which begins at a maximum of (T1–T0) seconds, and gradually decreases as the output catches up. In the example shown in FIG. 3, the compression factor is two times for each segment, meaning that the output plays back at on average two times the speed for which it was received as input. As such, if T1–T0 is 1 second, and T2–T1 is also one second (e.g., each time T corresponds to a change of 1 second), then two seconds of received input audio (from T0 to T2) can be played back as output in half that time, from T1 to T2.

Then at time T2, the output has caught up to the input, and the delay is nearly zero. At this point, the computing device may wait for a relative silence in the input signal to make a jump in the silence region to provide the input signal directly as output, without performing any compression or time reduction.

Figure 5:
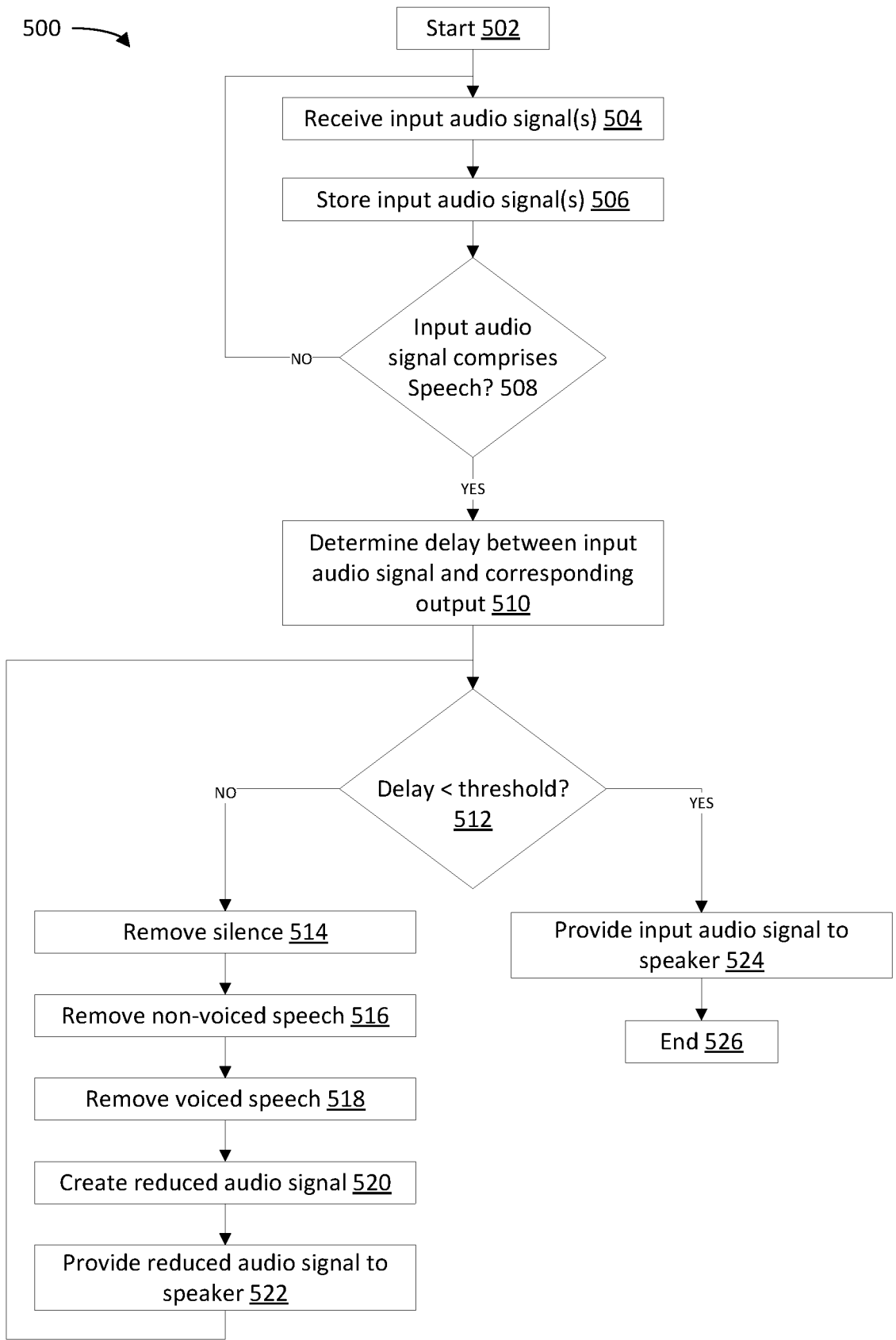
FIG. 5 is a flowchart illustrating an example method according to embodiments of the present disclosure.

FIG. 5 illustrates a flowchart of an example method 500 according to embodiments of the present disclosure. Method 500 may allow an auto-mixer to gate microphones on and off based on speech detection, without losing or discarding the speech received during the speech recognition period. The flowchart of FIG. 5 is representative of machine readable instructions that are stored in memory (such as memory 212) and may include one or more programs which, when executed by a processor (such as processor 210) may cause computing device 110 and/or one or more systems or devices to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-4, some functions of those components will not be described in detail below.

Method 500 may start at block 502. At block 504, method 500 may include receiving an input audio signal via a microphone. And at block 506, method 500 may include storing the input audio signal. As described above, embodiments herein may include continuously storing the input audio signal as it is received, contemporaneously with the other functions or acts that are described.

At block 508, method 500 may include determining whether the input audio signal comprises speech. As noted above, this can include analyzing a first segment of the input audio signal, applying one or more filters, or otherwise detecting the presence of speech in the signal. If not speech is detected, the method refers back to block 504.

If speech is detected, method 500 may include measuring a delay between the input audio signal and a corresponding output signal based on control of an external buffer signal. As noted above, the initial value of this delay may be the amount of time required to determine whether there is speech in the audio signal at block 508. After it is determined that there is speech in the input audio signal, the input audio signal may begin to be output. As such, the delay may be introduced because of the time required to determine whether there is speech.

At block 512, method 500 may include determining whether the delay is less than a threshold. This threshold may be a fundamental period, or some other period corresponding to the input or output audio signal. When the input audio signal is first output, the delay may be at a maximum. The maximum delay may be the amount of time required to determine whether there is speech in the input audio signal.

If the delay is larger than the threshold, method 500 may proceed to block 514. At block 514, method 500 may include removing one or more segments of the input audio signal, in particular the segments that include silence. At block 516, method 500 may include removing one or more segments that include non-voiced speech. And at block 518, method 500 may include removing one or more segments including voiced speech. Blocks 514, 516, and 518 include the removal of various segments of the audio signal, which may be carried out as described above with respect to the fundamental period.

At block 520, method 500 may include creating a reduced audio signal. This reduced audio signal may be compressed in the time dimension, but may not have any compression in frequency or pitch.

At block 522, method 500 may include providing the reduced audio signal to a speaker for output. As indicated above, it should be noted that this may also or alternatively include providing the reduced audio signal to a remote speaker or computing device, for instance in a teleconferencing scenario.

Method 500 may then proceed back to block 512, to determine whether the delay has been reduced below the threshold. If the delay is less than the threshold, method 500 may proceed to block 524.

At block 524, method 500 may include providing the input audio directly to the speaker, rather than removing silence, non-voiced speech, or voiced speech. In some examples block 524 may include jump not related to the fundamental period of voiced speech or transition from providing the reduced audio signal to providing the input audio signal as output. Method 500 may then end at block 526.

It should be understood that the embodiments disclosed herein are for explanatory purposes, and as such the order and time-dependency of one or more actions may be reversed, or various actions may occur simultaneously or contemporaneously. For instance, in some examples, determining that the audio signal includes speech may be carried out simultaneously with the determination of the delay, the reduction of the delay, the removal of one or more segments of stored input audio, and more. Some examples may be described herein as being carried out in a linear process of one action following another. But other examples may include simultaneously carrying out one or more of the actions described herein.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A method comprising:
  receiving an input audio signal;
  storing the input audio signal;
  determining, based on a first segment of the input audio signal, that the input audio signal comprises speech;
  measuring a delay between the input audio signal and a corresponding output audio signal provided to a speaker based on control of an external buffer signal;
  reducing the delay, wherein reducing the delay comprises:
    removing one or more segments of the stored input audio signal to create a time-compressed audio signal, wherein removing the one or more segments of the stored input audio signal comprises categorizing segments of the input audio signal based on (i) segments comprising silence, (ii) segments comprising non-periodic content, and (iii) segments comprising periodic content, and wherein the method further comprises prioritizing removal of category (i) segments first, removal of category (ii) segments second, and removal of category (iii) segments third; and
    providing the time-compressed audio signal as the corresponding output audio signal;
  determining that the delay is less than a threshold duration; and
  responsively providing the input audio signal as the corresponding output audio signal.

2. The method of claim 1, wherein the delay between the input audio signal and the corresponding output audio signal changes over time, and comprises a duration of the first segment of the input audio signal at a point in time at which it is determined that the input audio signal comprises speech.

3. The method of claim 1, wherein reducing the delay further comprises:
  determining a fundamental period corresponding to the input audio signal; and
  based on the fundamental period, determining one or more audio segments for removal corresponding to the input audio signal.

4. The method of claim 3, wherein the fundamental period is determined by applying a circular averaged magnitude difference function to the input audio signal.

5. The method of claim 3, wherein the fundamental period is determined by applying one or more of (a) an Average Squared Mean Difference Function, (b) an autocorrelation function, (c) zero crossing detection, (d) a YIN algorithm, (e) a McLeod Pitch method, and (f) a periodogram to the input audio signal.

6. The method of claim 3, wherein the fundamental period is determined by applying one or more of (a) a Harmonic Product Spectrum, (b) a cepstral pitch detection algorithm, (c) Spectral Reassignment, and (d) Maximum Likelihood Estimation to a frequency domain representation of the input audio signal.

7. The method of claim 3, wherein the audio segments for removal are stored in a circular buffer, and wherein removing the one or more segments of the stored input audio signal comprises removing one or more segments of periodic audio content.

8. The method of claim 7, wherein removing the one or more segments of periodic audio content comprises removing a plurality of non-adjacent periodic regions.

9. The method of claim 1, wherein removing the one or more segments of the stored input audio signal comprises applying a time domain pitch synchronous overlap add (TD-PSOLA) function to the input audio signal.

10. The method of claim 1, wherein removing the one or more segments of the stored input audio signal comprises applying a frequency domain buffer removal with overlap and add to a frequency domain representation of the input audio signal.

11. The method of claim 1, wherein removing the one or more segments of the stored input audio signal comprises removing one or more segments including non-voiced speech.

12. The method of claim 1, wherein removing the one or more segments of the stored input audio signal comprises removing one or more segments not including speech.

13. The method of claim 1, wherein determining that the delay is less than the threshold duration comprises determining that the delay is less than one fundamental period of the input audio signal.

14. The method of claim 1, wherein responsive to determining that the delay is less than the threshold duration, the method further comprises:
  determining that the input audio signal comprises silence; and
  responsively performing a jump to return to real-time playback by providing the input audio signal as the corresponding output audio signal.

15. A system for auto-mixing audio signals comprising:
a microphone configured to receive an input audio signal;
a speaker configured to playback an output audio signal corresponding to the input audio signal; and
a processor configured to:
  receive the input audio signal;
  store the input audio signal;
  determine, based on a first segment of the input audio signal, that the input audio signal comprises speech;
  determine a delay between the input audio signal and the corresponding output audio signal;
  reduce the delay, wherein reducing the delay comprises:
    removing one or more segments of the stored input audio signal to create a time-compressed audio signal, wherein removing the one or more segments of the stored input audio signal comprises categorizing segments of the input audio signal based on (i) segments comprising silence, (ii) segments comprising non-periodic content, and (iii) segments comprising periodic content, and prioritizing removal of category (i) segments first, removal of category (ii) segments second, and removal of category (iii) segments third; and
    providing the time-compressed audio signal as the corresponding output audio signal;
  determine that the delay is less than a threshold duration; and
  responsively provide the input audio signal as the corresponding output audio signal.

16. The system of claim 15, further comprising a plurality of microphones configured to receive a plurality of respective microphone audio signals, wherein the processor is further configured to:
  receive the plurality of respective microphone audio signals;
  store at least a portion of the plurality of respective microphone audio signals;
  determine, based on respective first segments of each of the plurality of respective microphone audio signals, that a first microphone audio signal comprises speech; and
  set the input audio signal as the first microphone audio signal.

17. The system of claim 15, wherein reducing the delay further comprises:
  determining a fundamental period corresponding to the input audio signal based on a circular averaged magnitude difference function applied to the input audio signal; and
  based on the fundamental period, determining one or more audio segments containing periodic content corresponding to the input audio signal.

18. The system of claim 17, wherein the audio segments containing periodic content are stored in a circular buffer, and wherein removing the one or more segments of the stored input audio signal comprises removing a plurality of non-adjacent audio segments containing periodic content.

19. The system of claim 15, wherein reducing the delay further comprises:
  determining a fundamental period corresponding to the input audio signal based on one or more of (a) an Average Squared Mean Difference Function, (b) an autocorrelation function, (c) zero-crossing detection, (d) a YIN algorithm, (e) a McLeod Pitch Method, and (f) a periodogram applied to the input audio signal; and
  based on the fundamental period, determining one or more audio segments containing periodic content corresponding to the input audio signal.

20. The system of claim 15, wherein reducing the delay further comprises:
  determining a fundamental period corresponding to the input audio signal based on one or more of (a) a Harmonic Product Spectrum, (b) a cepstral pitch detection algorithm, (c) Spectral Reassignment, and (d) maximum likelihood estimation of a frequency domain representation of the input audio signal; and
  based on the fundamental period, determining one or more audio segments containing periodic content corresponding to the input audio signal.

21. The system of claim 20, wherein removing the one or more segments of the stored input audio signal comprises applying a frequency domain buffer removal with overlap and add to the frequency domain representation of the input audio signal.

22. The system of claim 15, wherein removing the one or more segments of the stored input audio signal comprises applying a time domain pitch synchronous overlap add (TD-PSOLA) function to the input audio signal.

23. The system of claim 15, wherein responsive to determining that the delay is less than the threshold duration, the processor is further configured to:
  determine that the input audio signal comprises silence; and
  responsively perform a jump to return to real-time playback by providing the input audio signal as the corresponding output audio signal.

24. A method comprising:
  receiving an input audio signal;
  storing the input audio signal;
  determining, based on a first segment of the input audio signal, that the input audio signal comprises speech;
  measuring a delay between the input audio signal and a corresponding output audio signal provided to a speaker based on control of an external buffer signal;
  reducing the delay, wherein reducing the delay comprises:
    removing one or more segments of the stored input audio signal to create a time-compressed audio signal; and
    providing the time-compressed audio signal as the corresponding output audio signal;
  determining that the delay is less than a threshold duration, wherein determining that the delay is less than the threshold duration comprises determining that the delay is less than one fundamental period of the input audio signal; and
  responsively providing the input audio signal as the corresponding output audio signal.

25. The method of claim 24, wherein reducing the delay further comprises:
  determining a fundamental period corresponding to the input audio signal; and
  based on the fundamental period, determining one or more audio segments for removal corresponding to the input audio signal.

26. The method of claim 25, wherein the fundamental period is determined by applying one or more of:
  (a) a circular averaged magnitude difference function, (b) an Average Squared Mean Difference Function, (c) an autocorrelation function, (d) zero crossing detection, (e) a YIN algorithm, (f) a McLeod Pitch method, and (g) a periodogram, to the input audio signal, and (h) a Harmonic Product Spectrum, (i) a cepstral pitch detection algorithm, (j) Spectral Reassignment, and (k) Maximum Likelihood Estimation, to a frequency domain representation of the input audio signal.

27. The method of claim 25, wherein the audio segments for removal are stored in a circular buffer, and wherein removing the one or more segments of the stored input audio signal comprises removing one or more segments of periodic audio content, and wherein removing one or more segments of periodic audio content comprises removing a plurality of non-adjacent periodic regions.

28. The method of claim 24, wherein removing the one or more segments of the stored input audio signal comprises either:
   applying a time domain pitch synchronous overlap add (TD-PSOLA) function to the input audio signal, or
   applying a frequency domain buffer removal with overlap and add to a frequency domain representation of the input audio signal.

29. The method of claim 24, wherein removing the one or more segments of the stored input audio signal comprises removing one or more segments including non-voiced speech, or removing one or more segments not including speech.

30. A system for auto-mixing audio signals comprising:
   a microphone configured to receive an input audio signal;
   a speaker configured to playback an output audio signal corresponding to the input audio signal; and
   a processor configured to:
      receive the input audio signal;
      store the input audio signal;
      determine, based on a first segment of the input audio signal, that the input audio signal comprises speech;
      determine a delay between the input audio signal and the corresponding output audio signal;
      reduce the delay, wherein reducing the delay comprises:
         removing one or more segments of the stored input audio signal to create a time-compressed audio signal; and
         providing the time-compressed audio signal as the corresponding output audio signal;
      determine that the delay is less than a threshold duration, wherein determining that the delay is less than the threshold duration comprises determining that the delay is less than one fundamental period of the input audio signal; and
      responsively provide the input audio signal as the corresponding output audio signal.

31. The system of claim 30, wherein reducing the delay further comprises:
   determining a fundamental period corresponding to the input audio signal; and
   based on the fundamental period, determining one or more audio segments for removal corresponding to the input audio signal.

32. The system of claim 31, wherein the processor is further configured to determine the fundamental period by applying one or more of:
   (a) a circular averaged magnitude difference function, (b) an Average Squared Mean Difference Function, (c) an autocorrelation function, (d) zero crossing detection, (e) a YIN algorithm, (f) a McLeod Pitch method, and (g) a periodogram, to the input audio signal, and
   (h) a Harmonic Product Spectrum, (i) a cepstral pitch detection algorithm, (j) Spectral Reassignment, and (k) Maximum Likelihood Estimation, to a frequency domain representation of the input audio signal.

33. The system of claim 31, wherein the audio segments for removal are stored in a circular buffer, and wherein removing the one or more segments of the stored input audio signal comprises removing one or more segments of periodic audio content, and wherein removing one or more segments of periodic audio content comprises removing a plurality of non-adjacent periodic regions.

34. The system of claim 30, wherein removing the one or more segments of the stored input audio signal comprises either:
   applying a time domain pitch synchronous overlap add (TD-PSOLA) function to the input audio signal, or
   applying a frequency domain buffer removal with overlap and add to a frequency domain representation of the input audio signal.

35. The system of claim 30, wherein removing the one or more segments of the stored input audio signal comprises removing one or more segments including non-voiced speech, or removing one or more segments not including speech.

36. A method comprising:
   receiving an input audio signal;
   storing the input audio signal;
   determining, based on a first segment of the input audio signal, that the input audio signal comprises speech;
   measuring a delay between the input audio signal and a corresponding output audio signal provided to a speaker based on control of an external buffer signal;
   reducing the delay, wherein reducing the delay comprises:
      removing one or more segments of the stored input audio signal to create a time-compressed audio signal; and
      providing the time-compressed audio signal as the corresponding output audio signal;
   determining that the delay is less than a threshold duration, and responsive to determining that the delay is less than the threshold duration:
      determining that the input audio signal comprises silence; and
      responsively performing a jump to return to real-time playback by providing the input audio signal as the corresponding output audio signal.

37. The method of claim 36, wherein reducing the delay further comprises:
   determining a fundamental period corresponding to the input audio signal; and
   based on the fundamental period, determining one or more audio segments for removal corresponding to the input audio signal.

38. The method of claim 37, wherein the fundamental period is determined by applying one or more of:
   (a) a circular averaged magnitude difference function, (b) an Average Squared Mean Difference Function, (c) an autocorrelation function, (d) zero crossing detection, (e) a YIN algorithm, (f) a McLeod Pitch method, and (g) a periodogram, to the input audio signal, and
   (h) a Harmonic Product Spectrum, (i) a cepstral pitch detection algorithm, (j) Spectral Reassignment, and (k) Maximum Likelihood Estimation, to a frequency domain representation of the input audio signal.

39. The method of claim 37, wherein the audio segments for removal are stored in a circular buffer, and wherein removing the one or more segments of the stored input audio signal comprises removing one or more segments of periodic audio content, and wherein removing the one or more segments of periodic audio content comprises removing a plurality of non-adjacent periodic regions.

40. The method of claim 36, wherein removing the one or more segments of the stored input audio signal comprises either:
   applying a time domain pitch synchronous overlap add (TD-PSOLA) function to the input audio signal, or
   applying a frequency domain buffer removal with overlap and add to a frequency domain representation of the input audio signal.

41. The method of claim 36, wherein removing the one or more segments of the stored input audio signal comprises removing one or more segments including non-voiced speech, or removing one or more segments not including speech.

42. A system for auto-mixing audio signals comprising:
   a microphone configured to receive an input audio signal;
   a speaker configured to playback an output audio signal corresponding to the input audio signal; and
   a processor configured to:
      receive the input audio signal;
      store the input audio signal;
      determine, based on a first segment of the input audio signal, that the input audio signal comprises speech;
      determine a delay between the input audio signal and the corresponding output audio signal;
      reduce the delay, wherein reducing the delay comprises:
         removing one or more segments of the stored input audio signal to create a time-compressed audio signal; and
         providing the time-compressed audio signal as the corresponding output audio signal;
      determine that the delay is less than a threshold duration, and responsive to determining that the delay is less than the threshold duration:
         determine that the input audio signal comprises silence; and
         responsively perform a jump to return to real-time playback by providing the input audio signal as the corresponding output audio signal.

43. The system of claim 42, wherein reducing the delay further comprises:
   determining a fundamental period corresponding to the input audio signal; and
   based on the fundamental period, determining one or more audio segments for removal corresponding to the input audio signal.

44. The system of claim 43, wherein the processor is further configured to determine the fundamental period by applying one or more of:
   (a) a circular averaged magnitude difference function, (b) an Average Squared Mean Difference Function, (c) an autocorrelation function, (d) zero crossing detection, (e) a YIN algorithm, (f) a McLeod Pitch method, and (g) a periodogram, to the input audio signal, and
   (h) a Harmonic Product Spectrum, (i) a cepstral pitch detection algorithm, (j) Spectral Reassignment, and (k) Maximum Likelihood Estimation, to a frequency domain representation of the input audio signal.

45. The system of claim 43, wherein the audio segments for removal are stored in a circular buffer, and wherein removing the one or more segments of the stored input audio signal comprises removing one or more segments of periodic audio content, and wherein removing one or more segments of periodic audio content comprises removing a plurality of non-adjacent periodic regions.

46. The system of claim 42, wherein removing the one or more segments of the stored input audio signal comprises either:
   applying a time domain pitch synchronous overlap add (TD-PSOLA) function to the input audio signal, or
   applying a frequency domain buffer removal with overlap and add to a frequency domain representation of the input audio signal.

47. The system of claim 42, wherein removing the one or more segments of the stored input audio signal comprises removing one or more segments including non-voiced speech, or removing one or more segments not including speech.

* * * * *